(12) United States Patent
Tateishi et al.

(10) Patent No.: US 8,272,284 B2
(45) Date of Patent: Sep. 25, 2012

(54) ELECTRONICALLY DRIVEN LINEAR ACTUATOR

(75) Inventors: Koji Tateishi, Iwata (JP); Yoshinori Ikeda, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 11/869,928

(22) Filed: Oct. 10, 2007

(65) Prior Publication Data

US 2008/0092679 A1 Apr. 24, 2008

(30) Foreign Application Priority Data

Oct. 10, 2006 (JP) ................................. 2006-276373

(51) Int. Cl.
*F16H 55/00* (2006.01)
(52) U.S. Cl. ..................................... 74/89.37; 74/89.23
(58) Field of Classification Search ................. 74/89.23, 74/424.81, 89.37, 89.34
See application file for complete search history.

(56) References Cited

U.S. PATENT DOCUMENTS

| | | | | |
|---|---|---|---|---|
| 3,161,074 A * | 12/1964 | Korthaus et al. | ............. | 74/89.34 |
| 3,277,736 A * | 10/1966 | Goodman | ................... | 74/89.37 |
| 3,691,858 A * | 9/1972 | Wilke | ......................... | 74/89.34 |
| 4,479,397 A * | 10/1984 | Jelinek et al. | ................ | 74/89.37 |
| 4,779,473 A * | 10/1988 | Grady et al. | ................ | 74/89.36 |
| 5,174,167 A * | 12/1992 | Hill et al. | ..................... | 74/89.37 |
| 5,865,272 A * | 2/1999 | Wiggins et al. | ............. | 185/40 R |
| 5,891,485 A * | 4/1999 | Emoto | .......................... | 425/145 |
| 6,293,723 B1 * | 9/2001 | Kiefer | ............................. | 403/21 |
| 6,418,807 B2 * | 7/2002 | Gladen | ........................ | 74/89.33 |
| 6,490,942 B1 * | 12/2002 | Meyer | .......................... | 74/89.37 |
| 7,114,940 B2 * | 10/2006 | Ickinger et al. | ............... | 425/145 |
| 7,347,115 B2 * | 3/2008 | Otaki et al. | ................... | 74/89.38 |
| 7,950,301 B2 * | 5/2011 | Yamaguchi | ................... | 74/89.23 |
| 2001/0029797 A1 * | 10/2001 | Lange et al. | ................. | 74/89.37 |
| 2001/0039846 A1 * | 11/2001 | Nagai et al. | ................. | 74/89.36 |
| 2002/0086766 A1 * | 7/2002 | Hayashi et al. | ............... | 475/312 |
| 2005/0178232 A1 * | 8/2005 | Suda et al. | ...................... | 74/498 |
| 2006/0081076 A1 * | 4/2006 | Otaki et al. | .................... | 74/89.4 |
| 2006/0131113 A1 * | 6/2006 | Christof et al. | ............. | 188/72.1 |
| 2011/0048146 A1 * | 3/2011 | Ou et al. | ....................... | 74/89.23 |
| 2011/0107859 A1 * | 5/2011 | Osterlanger et al. | ......... | 74/89.37 |
| 2011/0113955 A1 * | 5/2011 | Fukano et al. | ................. | 92/172 |
| 2011/0234021 A1 * | 9/2011 | Eckstein et al. | ........... | 310/12.31 |

FOREIGN PATENT DOCUMENTS

JP 07-186065 7/1995
JP 2002-130415 5/2002

* cited by examiner

*Primary Examiner* — Justin Krause
*Assistant Examiner* — Matthew R Vaerewyck
(74) *Attorney, Agent, or Firm* — Harness, Dickey & Pierce, P.L.C.

(57) ABSTRACT

An electrically driven linear actuator (1) has an electric motor with a ball screw mechanism (3 and 4) connected to an output shaft (2a) of the electric motor (2), via a power transmitting mechanism (10 and 12) to convert a rotary motion of the electric motor (2) to a linear motion of an object member to be controlled by the actuator (1). Housing members (5, 6 and 8) contain the ball screw mechanism (3 and 4) and the power transmitting mechanism (10 and 12). Stroke end members (14 and 14), of a ball screw shaft (4) or a ball screw nut (3) forming the ball screw mechanism (3 and 4), are rotatably supported relative to the housing members (5 and 8) via a free rotation mechanism (20 and 20).

4 Claims, 3 Drawing Sheets

ELECTRONICALLY DRIVEN LINEAR ACTUATOR

CROSS-REFERENCE TO RELATED APPLICATIONS

This application claims priority to Japanese Patent Application No. 2006-276373, filed Oct. 10, 2006, which application is herein expressly incorporated by reference.

FIELD

The present disclosure relates to an electrically driven linear actuator used in a drive train of a vehicle, such as an automobile, and more particularly to an electrically driven linear actuator to convert rotary motion of an electric motor to linear motion of an output member of the actuator, via a ball screw mechanism.

BACKGROUND

In electrically driven linear actuator used in many types of driving mechanisms of a vehicle, such as an automobile and the like, a trapezoidal screw thread or a gear mechanism, such as a rack and pinion, are used as the mechanism to convert the rotary motion of the electric motor to the linear motion in an axial direction. These converting mechanisms usually have sliding contact portions and thus a defect of power loss, which needs power up of the electric motor and thus is obliged to increase the power consumption. Accordingly, ball screw mechanisms have been increasingly used as a more efficient actuator.

The ball screw is a mechanical element to convert a rotational movement to an axial translation motion, a linear motion. The ball screw includes a ball screw shaft with a helical ball screw groove formed on its outer circumferential surface. A ball screw nut has a helical ball screw groove formed on its inner circumferential surface. A plurality of balls are contained in a ball raceway formed between the helical ball screw grooves of the ball screw shaft and nut.

The reciprocal stroke of the ball screw actuator is finite and is several millimeters. In order to prevent overrunning of the linear motion of the ball screw shaft or the ball screw nut, it is necessary to provide mechanical stoppers at both ends of the stroke. Although it is possible to electrically control the stroke of the actuator using a limit sensor, the mechanical stoppers are required to prevent an accidental overrunning of the actuator.

The ball screw mechanism acts as a boosting mechanism to convert a rotational force to a thrust force. Accordingly, a large thrust force is generated between an abutting member and the ball screw shaft or the ball screw nut when either one of them strikes against the abutting member at the end of the stroke. Since the ball screw shaft or the ball screw nut strikes against the abutting member during its rotation, it bites the abutting member due to its wedging action against the abutting member. Once it has been rigidly bitten, it is difficult to release from the bitten condition if trying to drive the electric motor in a reverse direction. This is due to the usual design of the electric motor which leaves less torque margin.

One method of releasing the bitten rigid engagement is proposed in Japanese Laid-open Patent Publication No. 186065/1995. Here a screw arranged within a driving screw shaft can be rotated to release the bitten engagement. Although detailed description of this method is not therein, it may be easily supposed that the bitten engagement is released by adding a large torque on the screw using a dedicated tool having a large arm ratio.

However there are several problems in the prior art. When the ball screw shaft or the ball screw nut strikes against the abutting member at the end of the stroke, it bites the abutting member due to its wedging action against the abutting member. According to the Japanese Laid-open Patent Publication No. 186065/1995, there are also problems that the strength of the ball screw shaft is reduced due to forming of screw threads within the shaft. Also, use of a dedicated tool is required, in order to release the bitten condition.

SUMMARY

It is an object of the present disclosure to provide an electrically driven linear actuator that prevents generation of the bitten engagement in the actuator. Thus, no reduction of the strength of the screw shaft is caused and dedicated tools are not required.

To achieve the above mentioned object, an electrically driven linear actuator comprises an electric motor with a ball screw mechanism connected to an output shaft of the electric motor, via a power transmitting mechanism to convert a rotary motion of the electric motor to a linear motion of an object member to be controlled by the actuator. Housing members contain the ball screw mechanism and the power transmitting mechanism. Stroke end members, of a ball screw shaft or a ball screw nut forming the ball screw mechanism, are rotatably supported relative to the housing members via a free rotation mechanism.

The free rotation mechanism can be rotated relative to the housing of the actuator while being entrained by the stroke end members when the stroke end members are urged toward the housing. Thus, the biting action of the stroke end members against the housing members can be effectively prevented.

The free rotation mechanism may be a thrust washer. This enables prevention of the biting action by a simple structure.

The free rotation mechanism may be a rolling bearing, such as a thrust needle bearing, a ball bearing etc. This enables prevention of the biting action due to lower coefficient of low rolling friction.

The free rotation mechanism may be arranged via an axial gap relative to the housing. This enables easy rotation of the free rotation mechanism when the stroke end mechanism. Thus, this prevents an increase in friction between mutually contacting members, the free rotation mechanism, the housing members and the stroke end members.

An electrically driven linear actuator comprises an electric motor with a ball screw mechanism connected to an output shaft of the electric motor, via a power transmitting mechanism to convert a rotary motion of the electric motor to a linear motion of an object member to be controlled by the actuator. Housing members contain the ball screw mechanism and the power transmitting mechanism. Stroke end members, of a ball screw shaft or a ball screw nut that forms the ball screw mechanism, are rotatably supported relative to the housing members via a free rotation mechanism. This design provides an electrically driven linear actuator that prevents generation of the bitten engagement in the actuator. Thus, no reduction of strength of the screw shaft is caused and dedicated tools are not required.

An electrically driven linear actuator comprises an electric motor with a ball screw mechanism connected to an output shaft of the electric motor, via a power transmitting mechanism, to convert rotary motion of the electric motor to a linear motion of an object member to be controlled by the actuator.

Housing members contain the ball screw mechanism and the power transmitting mechanism. Stroke end members, of a ball screw shaft or a ball screw nut forming the ball screw mechanism, are rotatably supported relative to the housing members via a free rotation mechanism.

Further areas of applicability will become apparent from the description provided herein. It should be understood that the description and specific examples are intended for purposes of illustration only and are not intended to limit the scope of the present disclosure.

DRAWINGS

Additional advantages and features of the present invention will become apparent from the subsequent description and the appended claims, taken in conjunction with the accompanying drawings, wherein:

DETAILED DESCRIPTION

Preferable embodiments of the present disclosure will be hereinafter described with reference to the drawings.

Figure 1:
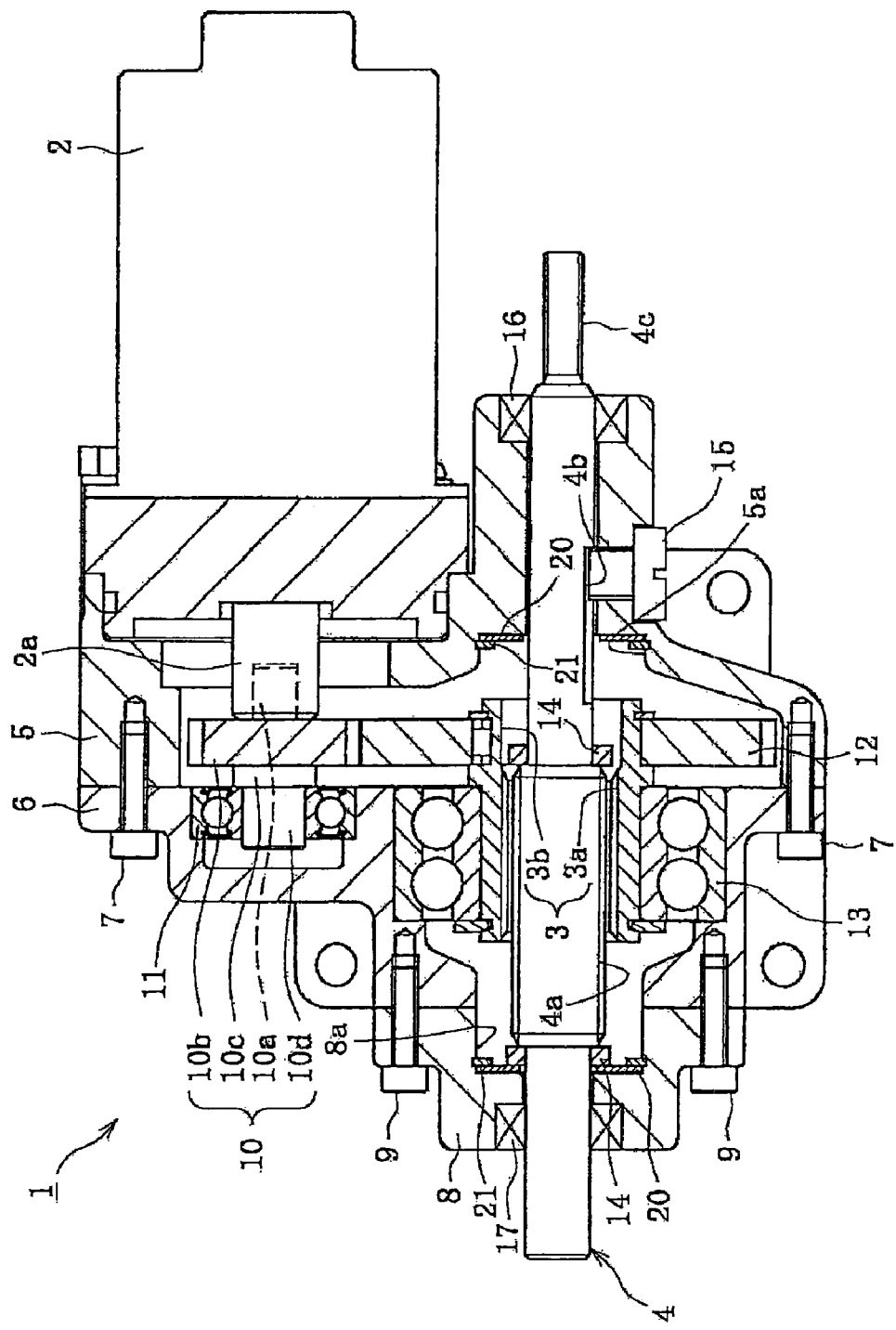
FIG. 1 is a longitudinal section view of an embodiment of the electrically driven linear actuator.
Figure 2:
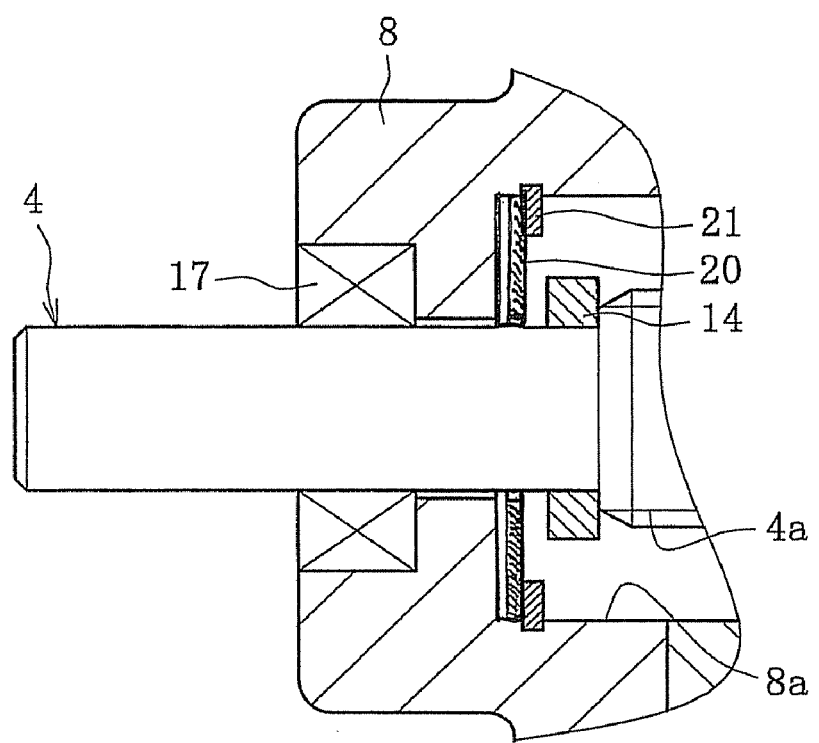
FIG. 2 is a partially enlarged view of the electrically driven linear actuator of FIG. 1.
Figure 3:
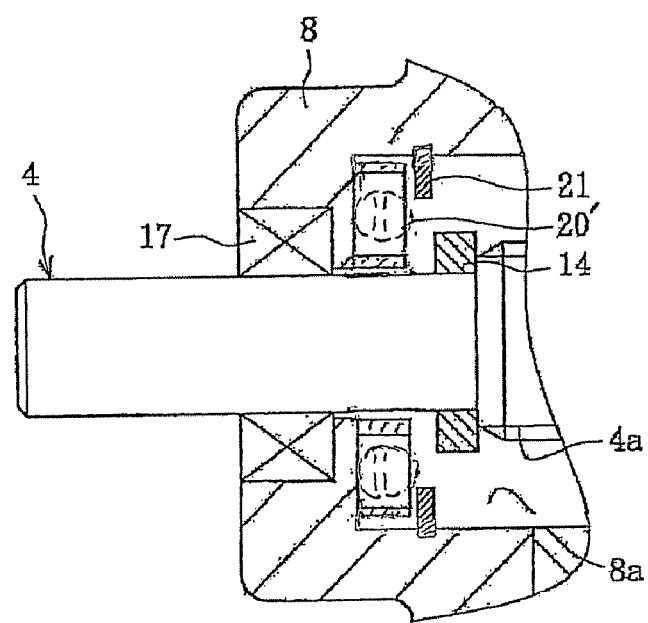
FIG. 3 is a view like FIG. 2 with a bearing thrust member.

FIG. 1 is a longitudinal section view of an embodiment of the electrically driven linear actuator. FIG. 2 is a partially enlarged view of the electrically driven linear actuator of FIG. 1. FIG. 3 is like FIG. 2 with a bearing thrust member.

The electrically driven linear actuator 1 includes a ball screw mechanism with a ball screw nut 3 rotationally driven by an electric motor 2. A ball screw shaft 4 threadably engages with the ball screw nut 3, via balls (not shown). When a motor shaft 2a of the electric motor 2 is rotated, the ball screw nut 3 is rotated to linearly move the ball screw shaft 4 in the left and right directions in FIG. 1. An object member (not shown) to be controlled is connected to one end of the ball screw shaft 4 and is moved to the left and right directions by rotation of the electric motor 2.

The ball screw nut 3 and the ball screw shaft 4 are contained within a housing formed by housing members 5, 6 and 8. The housing members 5 and 6 are united by fastening bolts 7. The electric motor 2 is mounted on the right side of the housing member 5. Housing member 8 is mounted on the left side of the housing member 6 and is united with it by fastening bolts 9.

The motor shaft 2a of the electric motor 2 is fit into a shaft 10a of a gear 10. A gear portion 10b is fitted on the shaft 10a at its nearly central portion. The shaft 10a has a stepped portion 10c and a smaller diameter portion 10d. The smaller diameter portion 10d is mounted on the housing member 6 via a rolling bearing 11.

An annular flange 12 is fitted on the outer circumferential surface of the ball screw nut 3, at its right side. Teeth are formed on the outer circumferential surface of the flange 12. The teeth mate with the teeth of the gear portion 10b. The inner circumferential surface at the right side of the ball screw nut 3 is formed with a countersunk portion 3b. The countersunk portion 3b prevents a stroke end member 14 of the ball screw shaft 4 from being contacted with the ball screw nut 3 when the ball screw shaft 4 is axially moved. The outer circumferential surface of the ball screw nut 3 is rotatably supported on the housing member 6 via a rolling bearing 13. The inner circumferential surface of the ball screw nut 3 is formed with a helical screw groove 3a.

The outer circumferential surface of the ball screw shaft 4, at its nearly central portion, is formed with a helical screw groove 4a. A plurality of balls (not shown) are arranged between the helical screw grooves 3a and 4a. Stroke end members 14 and 14 each have a cylindrical configuration and are fitted on the ball screw shaft 4 at either end of the helical screw groove 4a. The stroke end members 14 prevent mechanical overrunning of the ball screw shaft 4 when it is moved toward the left and right directions in FIG. 1.

A cutout portion 4b is formed on the outer circumferential surface of the ball screw shaft 4, at its right side in FIG. 1. A bolt 15 is screwed into the cutout portion 4b to prevent rotation of the ball screw shaft around its axis. The left and right side ends of the ball screw shaft 4 are slidably supported by the housing members 8 and 5 via bushes 17 and 16, respectively. A male thread 4c, formed on the rightmost end of the ball screw shaft 4, secures an object member (not shown) to be controlled by the actuator 1.

Annular thrust washer 20, positioned around the ball screw shaft 4, is arranged within a cylindrical bore 8a formed in the housing member 8. The thrust washer 20 is positioned adjacent to the bottom surface of the cylindrical bore 8a. Thus, the thrust washer 20 opposes the stroke end member 14 on the left side. The thrust washer 20 is secured by a snap ring 21, via a predetermined axial gap. The outer diameter of the thrust washer 20 is slightly smaller than the diameter of the bore 8a so that it can freely rotate within the bore 8a. Accordingly, the thrust washer 20 can rotate when the stroke end member 14, on the left side, abuts the thrust washer 20. Thus, the biting action of the ball screw shaft 4 against the housing member 8 can be effectively prevented.

Similarly annular thrust washer 20, positioned around the ball screw shaft 4, is arranged within a cylindrical bore 5a formed in the housing member 5. The thrust washer 20 is positioned adjacent to the bottom surface of the cylindrical bore 5a. Thus, the thrust washer 20 opposes the stroke end member 14 on the right side. The thrust washer 20 is secured by a snap ring 21, via a predetermined axial gap. The outer diameter of the thrust washer 20 is slightly smaller than the diameter of the bore 5a. Thus, the thrust washer 20 can freely rotate within the bore 5a. Accordingly, the thrust washer 20 can rotate when the stroke end member 14, on the right side, abuts the thrust washer 20. Thus, the biting action of the ball screw shaft 4 against the housing member 5 can be effectively prevented.

Although the illustrated embodiment uses thrust washers as the free rotation means, the present invention is not limited to thrust washers. Rolling bearings such as thrust needle bearings, ball bearings etc 20' (FIG. 3) may be used as the free rotation means. In addition, although it has been described where the electrically driven linear actuator rotates the ball screw nut and the ball screw shaft is axially moved, the present invention is not limited, and can be applied to an electrically driven linear actuator where the ball screw shaft is rotated and the ball screw nut is axially moved.

The electrically driven linear actuator of the present disclosure can be applied to electrically driven linear actuators used in driving portions of a vehicle such as an automobile.

The present disclosure has been described with reference to the preferred embodiment. Obviously, modifications and alternations will occur to those of ordinary skill in the art upon reading and understanding the preceding detailed description. It is intended that the present disclosure be construed as including all such alternations and modifications insofar as they come within the scope of the appended claims or their equivalents.

What is claimed is:

1. An electrically driven linear actuator comprising:

an electric motor;

a ball screw mechanism connected to an output shaft of the electric motor via a power transmitting mechanism for converting a rotary motion of the electric motor to a linear motion of an object member to be controlled by the actuator;

housing members for containing the ball screw mechanism and the power transmitting mechanism; and a pair of stroke end members separate from the ball screw mechanism, one of said stroke end members coupled with one terminal end of a ball screw shaft and the other stroke end member coupled with the other terminal end of the ball screw shaft, the ball screw shaft is rotatably coupled with a ball screw nut forming the ball screw mechanism, said stroke end members are rotatably supported relative to the housing members via a free rotation mechanism, said free rotation mechanism is positioned inside of the housing members to contact the housing members and is free to rotate with respect to said housing members and said free rotation mechanism only rotates when said stroke end members are directly pressed against said free rotation mechanism which, in turn, presses the free rotation mechanism against the housing members and the pair of stroke end members preventing an increase in a coefficient of low rolling friction and preventing biting action against the housing members.

2. An electrically driven linear actuator of claim 1 wherein said free rotation mechanism is a thrust washer.

3. An electrically driven linear actuator of claim 1 wherein said free rotation mechanism is a rolling bearing including a thrust needle bearing or a ball bearing.

4. An electrically driven linear actuator of claim 1 wherein said free rotation mechanism is arranged via an axial gap relative to the housing members.

* * * * *

UNITED STATES PATENT AND TRADEMARK OFFICE
CERTIFICATE OF CORRECTION

PATENT NO. : 8,272,284 B2
APPLICATION NO. : 11/869928
DATED : September 25, 2012
INVENTOR(S) : Koji Tateishi et al.

Page 1 of 1

It is certified that error appears in the above-identified patent and that said Letters Patent is hereby corrected as shown below:

On the Title Page, Item [54] and In the Specification, Column 1, Line 1:
Title "Electronically" should be --Electrically--

Signed and Sealed this
Nineteenth Day of March, 2013

Teresa Stanek Rea
*Acting Director of the United States Patent and Trademark Office*